United States Patent [19]

Harley

[11] 3,993,277
[45] Nov. 23, 1976

[54] PLASTICS FASTENERS
[75] Inventor: David N. Harley, North Harrow, England
[73] Assignee: ITW Limited, Chippenham, England
[22] Filed: Apr. 15, 1975
[21] Appl. No.: 568,229

[30] Foreign Application Priority Data
Apr. 17, 1974 United Kingdom............... 16796/74

[52] U.S. Cl. ..................................... 248/73; 85/72
[51] Int. Cl.² ........................................... F16L 3/08
[58] Field of Search............. 248/67.5, 71, 73, 74 R; 85/72, 77, 79, 83, 84, 69, 82, 49

[56] References Cited
UNITED STATES PATENTS

| | | | |
|---|---|---|---|
| 1,087,264 | 2/1914 | Sheppard................................. | 85/49 |
| 1,888,265 | 11/1932 | Guthrie..................................... | 85/49 |
| 2,664,458 | 12/1953 | Rapata..................................... | 85/72 X |
| 2,842,023 | 7/1958 | Majewski................................. | 85/49 |
| 3,157,417 | 11/1964 | Ruskin..................................... | 85/72 X |
| 3,199,816 | 8/1965 | Weisz...................................... | 248/71 |
| 3,411,397 | 11/1968 | Birmingham........................... | 85/72 |

FOREIGN PATENTS OR APPLICATIONS

| | | | |
|---|---|---|---|
| 37,548 | 9/1930 | France.................................... | 85/49 |
| 1,218,275 | 1/1971 | United Kingdom.................... | 85/72 |

Primary Examiner—Roy D. Frazier
Assistant Examiner—Terrell P. Lewis
Attorney, Agent, or Firm—J. R. Halvorsen; R. W. Beart

[57] ABSTRACT

A one-piece plastics fastener for securing to a support a wire whose ends are not available, the fastener comprising an axially-extending shank having a head formed at one end, the entire length of the shank and an adjacent portion of the head being bifurcated by a common slot, and the head further containing a transversely-extending passage which opens along one side to said slot and at each end to opposed sides of the head, whereby a central length of the wire can be passed through the slot and into the passage before anchoring the shank to the support.

7 Claims, 3 Drawing Figures

PLASTICS FASTENERS

This invention concerns one-piece plastics fasteners, and is particularly concerned with such fasteners which can be passed over a central length of a wire, whose ends are not available, to secure the wire to a support such as a wall or a post.

According to the present invention, a fastener of the kind described, comprises an axially-extending shank having a head formed at one end, the entire length of the shank and an adjacent portion of the head being bifurcated by a common slot, and the head further containing a transversely-extending passage which opens along one side to said slot and at each end to opposed sides of the head, whereby a central length of wire can be passed through the slot and into the passage before anchoring the shank to the support.

Preferably, a bore extends through the head and opens into the slot, the bore being capable of receiving an elongate member which, in use, extends into the slot to trap the wire in the passage, and to spread the split shank transversely outwards into frictional engagement with a cavity in the support to which the shank is to be anchored. The radially-outer surfaces of the shank may have protuberances for gripping the cavity to assist in anchoring the shank therein. The elongate member is preferably constituted by a pin of cylindrical shape which is integrally formed with the head, one end of the pin being secured to the head in axial alignment with the bore by at least one shearable rib. Alternatively, however, the elongate member can be a releasable insert, such as a metal screw. Also, preferably, the head extends radially outwards beyond the radially-outer surfaces of the shank to form at least one shoulder for limiting movement of the fastener into the cavity — in this arrangement the wire can be insulated from the support by that portion of the head lying therebetween.

A fastener embodying the present invention will now be described, by way of example only, with reference to the accompanying drawings, in which.

Figure 1:
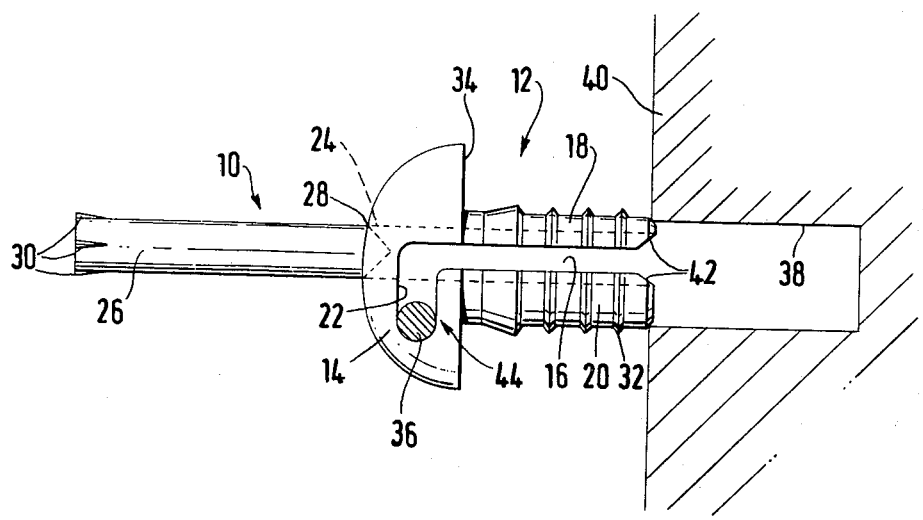
FIG. 1 is a side elevation of a fastener, also showing in section a wire and part of a support.

A fastener 10 comprises an axially-extending shank 12 having a head 14 formed at one end. The entire length of the shank 12 and an adjacent portion of the head 14 are bifurcated by a common slot 16, the split shank thus taking the form of two parallel legs 18 and 20. The head 14 further contains a transversely-extending passage 22 which opens along one side (the upper side as shown in FIG. 1) to said slot 16, and at each end (the left-hand and right-hand portions of FIG. 2) to opposed sides of the head 14. Thus, in FIG. 1 the viewer is looking along the passage 22 and through the head 14.

A bore 24, shown in broken line in FIG. 1, extends through the head 14 and opens into the slot 16, radially-inner surfaces of the legs 18 and 20 being shaped to define a partial-continuation of said bore 24. A pin 26 of cylindrical shape (constituting an elongate member according to the present invention) is integrally formed with the head 14, the right-hand end of the pin 26, as shown in FIG. 1, being pointed and being secured to the head 14 in axial alignment with the bore 24 by at least one shearable rib 28. The other end of the pin 26 is formed with radially outwardly extending protuberances shaped as fins 30. The diameter of the pin 26 is the same as, or slightly larger than, that of the partial-continuation of the bore 24.

Figure 2:
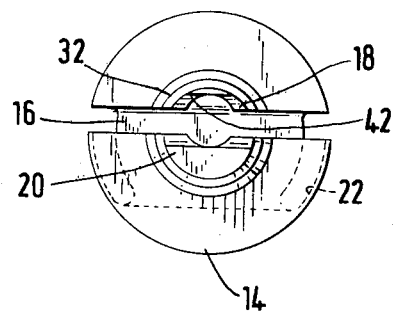
FIG. 2 is an end view looking from right to left of the fastener shown in FIG. 1; and, FIG. 3 is an end view similar to FIG. 2 but looking at FIG. 1 in the opposite direction.
Figure 3:
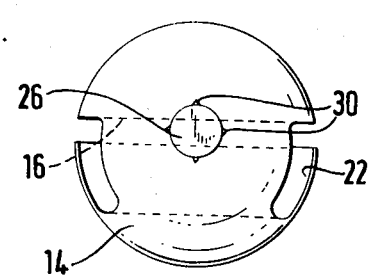

The shank 12 has a uniform cross-section along its length, radially-outer surfaces of the legs 18 and 20 lying on the circumference of a circle, as clearly shown in FIG. 2. The reader will note that the slot 16 does not pass symmetrically through the diameter of said circle, but is offset therefrom. The legs 18 and 20 are therefore dissimilar. Radially outer surfaces of those legs may be formed with protuberances shaped as axially-spaced part-circumferential ribs 32.

The head 14 is circular in end elevation and has the greatest diameter of the entire fastener. As shown in FIG. 1, the head 14 extends radially outwards beyond the radially-outer surfaces of the shank 12 to form an annular shoulder 34 — the head 14 consequently being co-axial with the shank 12.

The fastener 10 is integrally moulded in the form shown in the Figures in a plastics material, a suitable material being Nylon 66, and is intended to be used to secure a wire 36, having a diameter of the order of the height of the slot 16 or the width of the passage 22 (as shown in FIG. 1), to a cavity 38 in a support 40, the cavity 38 having a diameter slightly less than that of the shank 12. A central length of the wire 36, whose ends are not available, and which is probably in tension, is passed through the slot 16 and into the passage 22, its initial insertion being assisted by tapering surfaces 42. The two legs 18 and 20 are then flexed together, and pushed into the cavity 38 until the shoulder 34 abuts the adjacent surface of the support 40.

With the wire 36 in the lower portion of the passage 22, the pin 26 is hammered to shear the or each of the ribs 28 and then to pass along the bore 24 and its partial-continuation defined by the radially-inner surfaces of the legs 18 and 20. The pin 26 thus extends into the slot 16, and not only traps the wire 36 in the passage 22 but also spreads the legs 18 and 20 transversely outwards (i.e. away from one another) into frictional engagement with the cavity 38. The ribs 32 grip the cavity 38 to anchor the shank 12 therein even more firmly. The fins 30 prevent the pin 26 being pushed completely through the bore 24. It is to be noted that, in the final position, the wire 36 is insulated from the support 40 by that portion 44 of the head 14 lying therebetween.

It is not essential that the head 14 should extend radially outwards beyond the shank 12, but in contrast to the present fastener the passage 22 would not then be able to extend radially beyond the leg 20, and there would be no shoulder 34 for limiting movement of the fastener into the cavity 38 in the support 40. Nor is it essential that the pin 26 be integrally moulded with the fastener. It might be preferable in some applications to use a releasable insert such as a metal screw. In fact, the head 14 need not be formed with a bore 24 if the shank 12 is so formed that it can be securely anchored to the support 40 without the need for an insert. The shank 12 may, for example, be formed with legs (not shown) which diverge from one another with increasing distance from the head 14 — the legs being capable of being flexed to a position in which they could be regarded as constituting an axially-extending shank. Finally, the portions of the fastener which are circular in cross-section could, in fact, have any shape other than circular if resistance to rotation in the support was necessary.

I claim:

1. A one-piece plastics fastener for securing a wire whose ends are not available parallel to a surface of an apertured support, the fastener comprising an axially-extending shank having a laterally extending head formed at one end in which the head extends radially outwards beyond the radially-outer surfaces of the shank to form at least one shoulder for limiting movement, in use, of the fastener into a complimentary aperture in the support to which the shank is to be anchored, the entire length of the shank and an adjacent portion of the head being bifurcated by a common slot, and the head further containing a transversely-extending passage which opens along one side to communicate with said slot and at each end to opposed sides of the head with the opposite side of said passage being closed, whereby a central length of the wire can be passed solely through the slot and into the passage before anchoring the shank to the support, a bore extending through the head and opening into the slot, the bore being capable of receiving a pin which is integrally formed with the head, one end of the pin being secured to the head in axial alignment with the bore by at least one shearable rib, which, in use, extends into the slot to trap the wire in the passage, and to spread the split shank transversely outwards into frictional engagement with the apertured support to which the shank is to be anchored.

2. A fastener according to claim 1, in which radially-inner surfaces of the shank are shaped to define a partial-continuation of said bore.

3. A fastener according to claim 1, in which the other end of the pin is formed with protuberances which extend radially outwards to limit movement, in use, of the pin through the bore.

4. A fastener according to claim 1, in which radially-outer surfaces of the shank are formed with protuberances for gripping, in use, a cavity in the support to which the shank is to be anchored.

5. A fastener according to claim 1, in which the shank has a uniform cross-section along its length, in which the radially-outer surfaces of the shank lie on the circumference of a circle.

6. A fastener according to claim 5, in which the slot does not pass symmetrically through the diameter of said circle.

7. A fastener according to claim 1, in combination with a wire which is accommodated by the passage, and a support having an aperture within which the shank is anchored.

* * * * *